United States Patent [19]

Ohdan et al.

[11] Patent Number: 4,778,734
[45] Date of Patent: Oct. 18, 1988

[54] BARIUM FERRITE MAGNETIC POWDER AND MAGNETIC RECORDING MEDIUM CONTAINING THE SAME

[75] Inventors: Kyoji Ohdan; Takayuki Kimura; Hiroshi Miura; Kazuo Hashimoto, all of Ube, Japan

[73] Assignee: UBE Industries, Ltd., Yamaguchi, Japan

[21] Appl. No.: 151,203

[22] Filed: Feb. 1, 1988

[30] Foreign Application Priority Data

Feb. 3, 1987 [JP] Japan .................................. 62-21738
Jun. 16, 1987 [JP] Japan ................................ 62-147873
Jul. 24, 1987 [JP] Japan ................................ 62-183543

[51] Int. Cl.$^4$ ...................... C04B 35/26; G11B 5/706
[52] U.S. Cl. ................................. 428/694; 252/62.59; 252/62.6; 252/62.62; 252/62.63; 252/62.64; 428/328; 428/329
[58] Field of Search ................. 252/62.59, 62.6, 62.62, 252/62.63, 62.64; 428/328, 329, 694

[56] References Cited

U.S. PATENT DOCUMENTS 3,046,227  7/1962  Gorter et al. ..................... 252/62.59
4,414,124  11/1983 Endo et al. ......................... 252/62.59
4,698,182  10/1987 Nagai et al. ....................... 252/62.59

FOREIGN PATENT DOCUMENTS 1479036  4/1967  France ............................. 252/62.59
55-145304 11/1980 Japan .............................. 252/62.63

OTHER PUBLICATIONS

Kojima et al, "Ferrites: Proceedings of the International Conference", Jul. 1970, Japan, pp. 380–382.

Primary Examiner—Jack Cooper
Attorney, Agent, or Firm—Sherman and Shalloway

[57] ABSTRACT

A hexagonal magnetoplumbite-type barium ferrite magnetic powder represented by the following formula $$BaO \cdot n(Fe_{12-x-y-z}M^1_x M^2_y Zn_z O_{18-\alpha})$$

wherein $M^1$ represents at least one metal element selected from Co, Ni, Cu, Mg, and Mn; $M^2$ represents at least one metal element selected from Zr, Ti, and Ge; n is a number of from 0.8 to 1.0; x is a number of from 0.1 to 2.5; y is a number of from 0.1 to 1.5; x is a number of from 0.1 to 1.5; and $\alpha$ is $\frac{1}{2}(3-m)(x+y+z)$ in which m is a number of less than 3 and represents an average atomic valence of $M^1$, $M^2$ and Zn. The said hexagonal magnetoplumbite-type barium ferrite is useful for a magnetic recording medium.

10 Claims, 1 Drawing Sheet

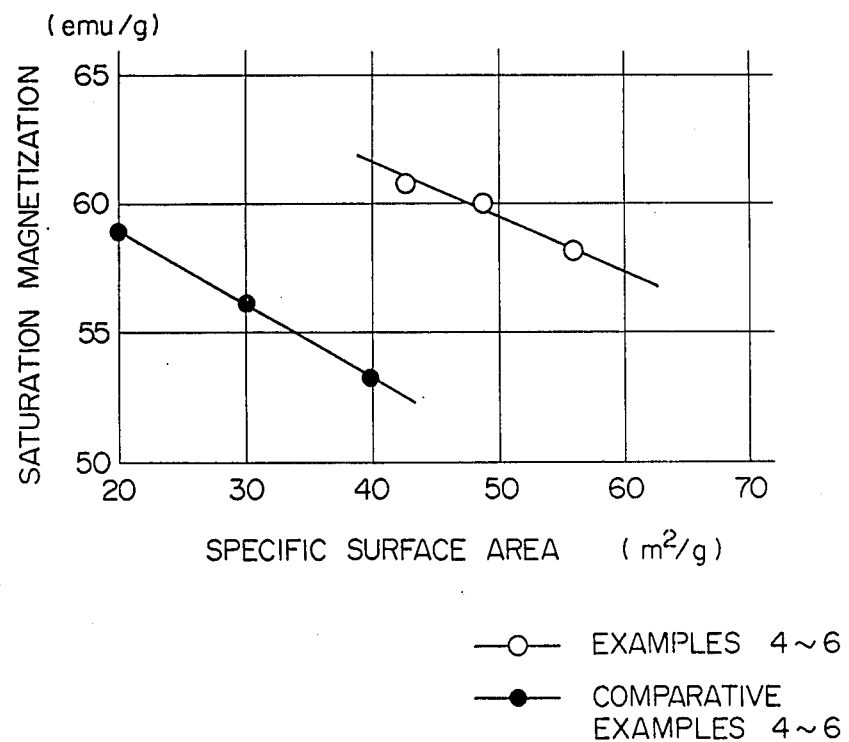

BARIUM FERRITE MAGNETIC POWDER AND MAGNETIC RECORDING MEDIUM CONTAINING THE SAME

BACKGROUND OF THE INVENTION

1. Field of the Invention

This invention relates to a a hexagonal magnetoplumbite-type barium ferrite magnetic powder and to a process for its production. More specifically, this invention relates to a magnetoplumbite-type barium ferrite magnetic powder having a specific surface area of usually 20 to 70 m$^2$/g and a coercive force of 200 to 2,000 Oe with a markedly enhanced saturation magnetization as compared with the prior art, which is suitable for use in high-density magnetic recording media, and to a process for its production.

2. Description of the Prior Art

In recent years, with the need for higher density magnetic recording, research and development work has been conducted on the method of perpendicular magnetic recording using magnetic recording media containing a barium ferrite magnetic powder.

The barium ferrite magnetic powder for use in the perpendicular magnetic recording method desirably has a proper coercive force (200 to 2,000 Oe) and as high a saturation magnetization as possible. It is desired moreover that the individual particles should be fine and uniform and have uniform magnetic characteristics and good dispersibility without agglomeration or sintering.

In particular, since the barium ferrite magnetic powder has lower saturation magnetization than other magnetic powders for magnetic recording media, fine barium ferrite particles having as high a saturation magnetization as possible are desired.

Various methods such as coprecipitation, glass crystallization and hydrothermal synthesis have previously been known for production of barium ferrite magnetic powders (see Japanese patent publications Nos. 50323/1985 and 15576/1985 and U.S. Pat. Nos. 4341648, 4585568, 4414124 and 4529524).

The conventional barium ferrite magnetic powders mentioned above result from substituting metallic elements such as Co, Ti, Ni, Mn, Cu, Zn, In, Ge, Nb and Zr, either alone or in combination, for part of Fe atoms of BaO.nFe$_2$O$_3$ so that the total valence of the substituent atoms becomes equal to the valence of the Fe atoms substituted.

The conventional barium ferrite magnetic powders, when in the form of fine particles having a specific surface area of at least 40 m$^2$/g, have the defect of showing a decreased saturation magnetization of not more than 55 emu/g. This is presumably because if the specific surface area of the barium ferrite magnetic powder becomes 40 m$^2$/g or more, the nonmagnetic layer portion of the surface of the particles cannot be ignored. Various metal elements added for adjustment of coercivity are also considered to be one cause.

Japanese Laid-Open patent publication Nos. 236104/1986 and 16232/1987 disclose the saturation magnetization of barium ferrite magnetic powder is increased by replacing Fe atoms by Zn.

The barium ferrite magnetic powder described in Japanese Laid-Open patent publication No. 236104/1986 is obtained by the glass crystallization method. This patent document does not give any specific description on the effect of using Zn alone as the substituent atom, and completely fails to describe the crystal structure, particle size, specific surface area and coercive force of the barium ferrite magnetic powder, the control of the coercive force, and the relation of Zn to other substituent elements.

In Japanese Laid-Open patent publication No. 16232/1987, as is the case with the aforesaid conventional barium ferrite magnetic powders, it is necessary to make the total valence of substituent atoms equal to the valence of the Fe atoms substituted and thus balance the valances of the atoms. Accordingly, when the amount of Zn added is increased, the amounts of other substituent atoms for balancing the valences also increase and consequently, the saturation magnetization of the barium ferrite magnetic powder is reduced.

SUMMARY OF THE INVENTION

It is an object of this invention therefore to overcome the various difficulties of the prior art, and to provide a fine barium ferrite magnetic powder which has a high saturation magnetization, a specific surface area of 20 to 70 m$^2$/g and a coercive force of 200 to 2,000 Oe and is suitable for use in magnetic recording media for high-density recording, and a process for its production.

Another object of this invention is to provide a magnetic recording medium comprising the barium ferrite magnetic powder.

Other objects of this invention along with its characteristic features will become apparent from the following description.

BRIEF DESCRIPTION OF THE DRAWING FIGURE

The FIGURE shows the relationship between saturation magnetization and specific surface area in barium ferrite magnetic powders obtained in Examples 4 to 6 and Comparative Examples 4 to 6.

DETAILED DESCRIPTION OF THE INVENTION

According to this invention, there is first provided a hexagonal magnetoplumbite-type barium ferrite magnetic powder represented by the following formula

$$BaO.n(Fe_{12-x-y-z}M_x{}^1M_y{}^2Zn_zO_{18-\alpha})$$

wherein M$^1$ represents at least one metal element selected from Co, Ni, Cu, Mg and Mn; M$^2$ represents at least one metal element selected from Zr, Ti and Ge; n is a number of from 0.8 to 1.0; x is a number of from 0.1 to 2.5; y is a number of from 0.1 to 1.5; x is a number of from 0.1 to 1.5; and $\alpha$ is $\frac{1}{2}(3-m)(x+y+z)$ in which m is a number of less than 3 and represents an average atomic valence of M$^1$, M$^2$ and Zn.

Thus, the barium ferrite magnetic powder of this invention results from modification of a hexagonal magnetoplumbite-type barium ferrite magnetic powder of the formula BaO.n(Fe$_{12}$O$_{18}$) by substituting metal elements M$^1$ and M$^2$ and Zn for part of Fe.

In the magnetic powder of the invention, the substituent metal element M$^1$ is a divalent metal atom selected from Co, Ni, Cu, Mg and Mn. These metal elements may be used singly or in combination. Co alone or a combination of Co with any of the other divalent metal elements stated is preferred because it permits relatively easy control of coercivity. When Co is used in combination with the other divalent metal element (namely, when M$^1$ is Co$_k$M$_{1-k}{}^3$ wherein M$^3$ is at least one metal element selected from Ni, Cu, Mg and Mn, and k is a number of more than 0 but less than 1), a barium ferrite magnetic powder having a moderate level of desirable coercivity is obtained irrespective of the type of the other divalent metal element $M^3$. Use of Ni, however, is preferred because the resulting magnetic powder has a sharp anisotropic field distribution and its coercive force varies little with temperature. In the atomic ratio ($Co/M^3=k/1-k$) of Co to the other divalent metal element, k is a number of more than 0 but less than 1. To take advantage of cotrolling the coercive force using Co, k is preferably in range of 0.2 to 0.8, especially in the rane of 0.25 to 0.50.

The amount, x, of substitution of the metal element $M^1$ is 0.1 to 2.5, preferably 0.5 to 2.0, more preferably 0.8 to 1.5. This enables the coercive force of the magnetic powder to be controlled to a value suitable for magnetic recording.

The metal element $M^2$ used in the magnetic powder of the invention is a tetravalent metal element selected from Zr, Ti and Ge. These metal elements may be used singly or in combination. Ti is preferred as $M^2$.

The amount, y, of substitution of the metal element $M^2$ is in the range of 0.1 to 1.5, preferably 0.1 to 1.0, more preferably 0.2 to 0.5. If y is less than 0.1, the resulting magnetic powder has a broadened particle size distribution. If it exceeds 1.5, the saturation magnetization of the resulting magnetic powder tends to decrease.

Zn is also substituted for Fe in the magnetic powder of this invention. The amount, z, of substitution of Zn is 0.1 to 1.5, preferably 0.3 to 1.2, more preferably 0.4 to 1.0. If z falls outside the above-specified range, one cannot fully expect an effect of enhancing the saturation magnetization of the barium ferrite magnetic powder.

The total amount (x+y+z) of the three substituent metal elements $M^1$, $M^2$ and Zn substituted is not strictly limited so long as x, y and z are individually within the above-specified ranges, and can be varied according to the desired characteristics of the resulting magnetic powder. Advantageously, the total amount (x+y+z) is 1 to 4, especially 1.5 to 3.

Advantageously, the average atomic valence m of the substituent metal elements $M^1$, $M^2$ and Zn represented by the following formula $$m = \frac{2x + 4y + 2z}{x + y + z}$$

is less than 3, usually 2.2 to 2.8, preferably 2.3 to 2.5. Thus, one characteristic feature of the barium ferrite magnetic powder of the invention is that the atomic valence (3) of Fe replaced is not balanced with the average atomic valence (m<3) of the replacing metal elements $M^1$, $M^2$ and Zn, and the average atomic valence of the replacing metal elements is less than the atomic valence of Fe. This feature has been found to contribute to the marked increase of the saturation magnetization of the resulting barium ferrite magnetic powder.

Since the average atomic valence m of the substituent metal elements $M^1$, $M^2$ and Zn in the magnetic powder of this invention is less than 3, the number of oxygen atoms constituting the barium ferrite magnetic powder is not 18 but (18−α) wherein α is $\frac{1}{2}(3-m)(x+y+z)$, and the electric charge of ferrite can be maintained neutral.

Typical characteristics of the barium ferrite magnetic powder of the invention having the above composition are shown below.
Specific surface area: 20 to 70 m²/g
Coercive force: 200 to 2,000 Oe
Saturation magnetization: ≧55 emu/g
Average particle diameter: 100 to 30 nm
Aspect ratio: 2 to 15

The magnetic powder of the invention can be produced by a hydrothermal synthesis method, for example by a method comprising the steps of (a) dissolving water-soluble compounds containing barium, iron, metal element $M^1$, metal element $M^2$ and zinc in water in such proportions that as atomic ratios of the metal elements, the barium to iron ratio is 1:(1−12), and the iron/$M^1$/$M^2$/zinc ratio is (12−x−y−z):x:y:z, (b) adding an alkali hydroxide to the resulting aqueous solution until the concentration of the alkali hydroxide in the solution after addition reaches at least 3 moles/liter, to form a precipitate, (c) hydrothermally treating the aqueous slurry containing the precipitate at a temperature of 120° to 300° C., and (d) mixing the hydrothermally treated precipitate with a flux and calcining the mixture at a temperature of 700° to 950° C.

The above method will be specifically described.

The water-soluble compounds containing the above metal elements as starting materials will first be described.

The barium-containing compound may be, for example, barium nitrate, barium chloride or barium hydroxide. In order to obtain hexagonal particles of a good shape, it is desirable to use the barium compound in a concentration of 0.03 to 0.60 gram-atom/liter, preferably 0.1 to 0.25 gram-atom/liter, as barium atom in aqueous solution.

The iron-containing compound may be, for example, ferric nitrate or ferric chloride. The suitable amount of the iron-containing compound is such that the atomic ratio of barium to iron is 1:(1−12), preferably 1:(3−10). If the amount of the iron-containing compound used is too small for the amount of the barium-containing compound, the amount of barium ferrite formed is small and the shape of the barium ferrite particles is not hexagonal as is desired. On the other hand, if the amount of the iron compound is too large, hematite forms as a by-product and/or the resulting barium ferrite particles become larger. Hence, its magnetic characteristics tends to be degraded.

The $M^1$-containing compound may be, for example, an inorganic compound, for example a chloride, nitrate or hydroxide of a metal element selected from Co, Ni, Cu, Mg and Mn, or an organic compound such as an acetate of $M^1$.

The $M^2$-containing compound may be, for example, an inorganic compound, for example a chloride or nitrate of a metal element selected from Zr, Ti and Ge, or an organic compound such as an isopropionate of $M^2$.

The zinc-containing compound may be, for example, zinc chloride, zinc nitrate, zinc acetate or zinc hydroxide.

The water-soluble compounds containing barium, iron, $M^1$, $M^2$ and zinc are dissolved in water in such proportions that the atomic ratio of barium to iron is 1:(1−12) and the atomic ratio of iron:$M^1$:$M^2$:zinc is (12−x−y−z)P:x:y:z (wherein x,y and z are as defined above) to prepare an aqueous solution.

Then, an alkali hydroxide is added to the aqueous solution to coprecipitate the metal elements in the form of hydroxides and/or oxides. Advantageously, the alkali hydroxide may be, for example, an alkali metal hydroxide such as sodium hydroxide or potassium hydroxide. Aqueous ammonia solution may also be used as the alkali hydroxide. The suitable amount of the alkali hydroxide used is such that the concentration of the alkali hydroxide in the solution after a precipitate forms is at least 3 moles/liter, preferably 4 to 8 moles/liter. If the amount of the alkali hydroxide used is too small, the resulting particles increase in size or the particle size distribution becomes broad. Furthermore, hematite is liable to form as a by-product. Use of an excessively large amount of the alkali hydroxide is not economical.

There is no particular restriction on the method of adding the alkali hydroxide to the aqueous solution. For example, the alkali hydroxide is directly added to the aqueous solution containing the metal compounds as starting materials, or the alkali hydroxide is added in the form of an aqueous solution. Alternatively, it is possible to first add the barium compound to an aqueous solution of the alkali hydroxide, and mix the solution with aqueous solutions containing compounds of iron and other metal compounds.

A water-soluble compound of Si or Ca, for example, silicic acid, sodium silicate, calcium nitrate or calcium chloride may be added in some amount to the aqueous solution of the starting metal compounds or the aqueous solution of the alkali hydroxide. These additives are preferred for controlling the shape of the resulting magnetic particles.

The resulting slurry containing the precipitate formed is usually charged into a pressure vessel such as an autoclave, and hydrothermally treated to give fine crystals of barium ferrite. The hydrothermal treatment temperature is generally 120° to 300° C., preferably 130° to 280° C. By performing the hydrothermal treatment at this temperature usually for 0.5 to 20 hours, crystals of barium ferrite are formed. If the hydrothermal treating temperature is too low, crystals do not form sufficiently. If it is too high, the particle diameter of the finally obtained barium ferrite undesirably becomes large.

Usually, the precipitate of fine crystals formed by the hydrothermal treatment is then washed with water to remove the free alkali component sufficiently. The resulting precipitate is mixed with a flux. Generally, at least one compound selected from sodium chloride, potassium chloride, barium chloride, strontium chloride and sodium fluoride is used as the flux. The amount of the flux used is generally 10 to 180% by weight, preferably 30 to 120% by weight, based on the dry weight of the precipitate. If the amount of the flux added is too small, sintering of the particles tends to occur. If it is too large, no corresponding advantage can be obtained and economical disadvantage results. There is no restriction on the method of mixing the precipitate with the flux. For example, the flux is added to the slurry of the precipitate and they are mixed in the wet state, after which the mixture is dried in a customary manner. It is also possible to dry the precipitate and mix it with the flux in the dry state.

The resulting mixture is then calcined to effect complete crystallization of barium ferrite. The calcination temperature is 700° to 950° C., preferably 800° to 930° C. If the temperature is too low, crystallization does not proceed and the resulting barium ferrite has a lowered saturation magnetization. If the temperature is too high, the resulting particles become large and undesirably undergo sintering. The suitable calcination time is about 10 minutes to about 30 hours. The atmosphere in which the calcination is performed is not particularly restricted, but generally, it is conveniently carried out in an air atmosphere.

The calcined product is washed, filtered and dried to give a barium ferrite magnetic powder. The washing may be carried out to such an extent as to fully remove the flux and impurities such as excess barium in the calcined product. Water, inorganic acids such as nitric acid or hydrochloric acid, and organic acids such as acetic acid and propionic acid may be used as a washing liquor for this purpose.

The barium ferrite magnetic powder provided by this invention may be advantageously used in magnetic recording media. A magnetic recording medium may be prepared by coating the barium ferrite magnetic powder and a binder resin on the surface of a support by a known method.

The support used for the production of magnetic recording media may be, for example, a polyethylene terephthalate film, a polyamide resin film, or a polyimide resin film as in ordinary magnetic recording materials.

Examples of the binder resin are vinyl chloride/vinyl acetate copolymer, cellulose derivatives, polyurethane resins and epoxy resins. As is customary in the art, a dispersing agent, a lubricant, a curing agent, a polishing agent, etc. may be added to the binder resin. The dispersing agent may be, for example, lecithin. The lubricant may be, for example, higher fatty acids and fatty acid esters. Difunctional or higher isocyanate compounds may be cited as examples of the curing agent. The polishing agent may be, for example, $Cr_2O_3$, $Al_2O_3$, and $\alpha$-$Fe_2O_3$. A magnetic recording medium may be prepared by a known method, for example by kneading the magnetic powder, the binder resin and additives together with a solvent to prepare a magnetic coating composition, applying the coating composition to a support, and subjecting the coated support to an orientation treatment, a drying treatment, etc.

The following Examples and Comparative Examples illustrate the present invention more specifically.

The various properties and characteristics in these examples were measured and determined by the following methods.

(1) Particle shape of the magnetic powder

The particle size and particle size distribution of the magnetic powder were measured with respect to 100 particles under a transmission-type electron microscope, and are expressed in average values. The aspect ratio (=particle diameter/particle thickness) was calculated from the particle diameter and specific surface area, under the assumption that the particles are in the shape of a regular hexagonal prism.

(2) Specific surface area of the magnetic powder

Measured by the BET method using $N_2$.

(3) Magnetic characteristics of the magnetic powder

Measured by a magnetometer using a vibrating sample.

(4) Variations in coercive force with temperature

This is a variation in coercive force for 1° C. between 20° C. and 150° C.

(5) Anisotropic field distribution of the magnetic powder

Measured by the following procedure.

1. Fill the magneitc powder in a disc-type cell and set it in a magnetometer of the vibration sample type.
2. Apply an external field of 10 kOe to the sample to magnetize it.
3. Rotate the sample through 90°, and at this position, measure the magnetization of the 90° component of the residual magnetization.
4. Return the sample to a 10° position, apply an external field of 250 Oe, and measure the magnetization of the 90° component.
5. Repeat the above procedure and apply an external field with an increment of 250 Oe at the 10° position until the magnetization at the 90° position is saturated. Measure the magnetization at the 90° position at saturation.
6. Calculate the variation ratios of the magnetization, and plot their relation to the external fields in a graph. Determine the half-value widths of the graph which is the anisotropic field distribution.

(6) Reproduction output of the medium

Measured by using a ferrite ring head (gap width 0.4 microns; track width 120 microns) at a medium/head relative speed of 3.5 m/sec. and a recording current of 1 AT.

EXAMPLE 1

In 1300 ml of deionized water were dissolved 1287.6 g of ferric nitrate [$Fe(NO_3)_3 \cdot 9H_2O$], 64.7 g of cobalt nitrate [$Co(NO_3)_2 \cdot 6H_2O$], 19.7 g of titanium tertra chloride ($TiCl_4$) and 35.2 g of zinc nitrate [$Zn(NO_3)_2 \cdot 6H_2O$]. Separately, 140.2 g of barium hydroxide [$Ba(OH)_2 \cdot 8H_2O$] and 1480 g of sodium hydroxide were dissolved in 1300 ml of deionized water. The two solutions were mixed to form a precipitate.

The slurry containing the formed precipitate was put in an autoclave and hydrothermally treated at 145° C. for 8 hours. The precipitate was thoroughly washed with water, filtered, and dried. A 1:1 by weight mixture of NaCl and $BaCl_2 \cdot 2H_2O$ as a flux was mixed with the precipitate (the weight of the flux was equal to that of the precipitate), and the mixture was calcined in an air atmosphere at 860° C. for 2 hours. The calcined product was thoroughly washed with water, filtered, and dried to obtain a barium ferrite magnetic powder.

X-ray powder diffractometry and composition analysis showed the resulting barium ferrite magnetic powder to be magnetoplumbite-type $BaO \cdot 0.98(Fe_{10.5}Co_{0.7\text{-}5}Ti_{0.35}Zn_{0.40}O_{17.6})$.

The shape properties and the magnetic characteristics of the resulting barium ferrite magnetic powder are shown in Table 1 below.

EXAMPLE 2

Ferric nitrate (1270.2 g), 69.0 g of cobalt nitrate, 16.9 g of titanium tetrachloride and 70.6 g of zinc nitrate were dissolved in 1300 ml of deionized water. Separately, 140.2 g of barium hydroxide and 1480 g of sodium hydroxide were dissolved in 1300 ml of deionized water. The two solutions were mixed to form a precipitate.

The slurry containing the formed precipitate was put in an autoclave, and hydrothermally treated at 170° C. for 8 hours. The precipitate was thoroughly washed with water, filtered, and dried. A 1:1 by weight mixture of NaCl and $BaCl_2 \cdot 2H_2O$ as a flux was mixed with the precipitate (the weight of the flux was equal to that of the precipitate), and the mixture was calcined in an air atmosphere at 890° C. for 2 hours. The calcined product was washed fully with water, filtered, and dried to give a barium ferrite powder.

X-ray powder diffractometry and composition analysis showed the resulting barium ferrite magnetic powder to be magnetoplumbite-type $BaO \cdot 0.97(Fe_{10.10}Co_{0.80}Ti_{0.30}Zn_{0.80}O_{17.35})$.

The shape properties and the magnetic characteristics of the barium ferrite magnetic powder are shown in Table 1.

COMPARATIVE EXAMPLE 1

Ferric nitrate (1263.1 g), 64.7 g of cobalt nitrate and 42.2 g of titanium tetrachloride were dissolved in 1300 ml of deionized water. Separately, 140.2 g of barium hydroxide and 1480 g of sodium hydroxide were dissolved in 1300 ml of deionized water. The two solutions were mixed to form a precipitate.

The slurry containing the formed precipitate was put in an autoclave, and hydrothermally treated at 190° C. for 6 hours. The precipitate was thoroughly washed with water, filtered and dried, and a 1:1 by weight mixture of NaCl and $BaCl_2 \cdot 2H_2O$ as a flux was mixed with the precipitate (the weight of the flux was equal to that of the precipitate). The mixture was calcined in an air atmosphere at 860° C. for 2 hours. The calcined product was washed thoroughly with water, filtered and dried to give a barium ferrite magnetic powder.

X-ray powder diffractometry and composition analysis showed the resulting barium ferrite magnetic powder to be magnetoplumbite-type $BaO \cdot 0.98(Fe_{10.5}Co_{0.7\text{-}5}Ti_{0.75}O_{18.0})$.

The shape properties and the magnetic characteristics of the barium ferrite magnetic powder are shown in Table 1.

COMPARATIVE EXAMPLE 2

Ferric nitrate (1263.1 g), 42.2 g of titanium tetrachloride and 70.0 g of zinc nitrate were dissolved in 1300 ml of deionized water. Separately, 140.2 g of barium hydroxide and 1480 g of sodium hydroxide were dissolved in 1300 ml of deionized water. The two solutions were mixed to form a precipitate.

The slurry containing the formed precipitate was put in an autoclave and hydrothermally treated at 190° C. for 6 hours. The precipitate was thoroughly washed with water, filtered and dried. Then, the dried precipitate was mixed with a 1:1 by weight mixture of NaCl and $BaCl_2 \cdot 2H_2O$ as a flux (the weight of the flux was equal to that of the precipitate). The mixture was calcined in an air atmosphere at 860° C. for 2 hours. The calcined product was washed thoroughly with water, filtered and dried to give a barium ferrite magnetic powder.

X-ray powder diffractometry and composition analysis showed the resulting barium ferrite magnetic powder to be magnetoplumbite-type $BaO \cdot 0.98(Fe_{10.5}Zn_{0.7\text{-}5}Ti_{0.75}O_{18.0})$.

The shape properties and the magnetic characteristics of the resulting barium ferrite magnetic powder are shown in Table 1.

COMPARATIVE EXAMPLE 3

Ferric nitrate (1363.3 g) and 76.5 g of zinc nitrate was dissolved in 1300 ml of deionized water. Separately, 140.2 g of barium hydroxide and 1480 g of sodium hydroxide were dissolved in 1300 ml of deionized water. The two solutions were mixed to form a precipitate.

The slurry containing the formed precipitate was put in an autoclave and hydrothermally treated at 170° C. for 8 hours. The precipitate was thoroughly washed with water, filtered and dried. Then, the dried precipitate was mixed with a 1:1 by weight mixture of NaCl and $BaCl_2.2H_2O$ as a flux (the weight of the flux was equal to that of the precipitate). The mixture was calcined in an air atmosphere at 860° C. for 2 hours. The calcined product was washed thoroughly with water, filtered and dried to give a barium ferrite magnetic powder.

X-ray powder diffractometry and composition analysis showed the resulting barium ferrite magnetic powder to consist of magnetoplumbite-type $BaO.0.98\text{-}(Fe_{11.15}Zn_{0.85}O_{17.58})$ as a main component and some amount of Zn ferrite.

The shape properties and the magnetic characteristics of the resulting barium ferrite magnetic powder are shown in Table 1.

TABLE 1

| Run (*) | Shape properties | | | Magnetic characteristics | |
|---|---|---|---|---|---|
| | Particle diameter (nm) | Aspect ratio | Standard deviation of the size distribution (nm) | Specific surface area (m²/g) | Coercive force (Oe) | Saturation magnetization (emu/g) |
| Ex. 1 | 60 | 5.8 | 6.0 | 51 | 760 | 61.5 |
| Ex. 2 | 70 | 6.6 | 6.3 | 48 | 590 | 64.3 |
| CEx. 1 | 65 | 5.8 | 6.5 | 47 | 840 | 54.1 |
| CEx. 2 | 72 | 5.3 | 6.0 | 40 | 635 | 52.3 |
| CEx. 3 | 100 | 12 | 36.0 | 54 | 1836 | 48.6 |

(*): Ex. = Example; CEx. = Comparative Example

EXAMPLE 3

Ferric nitrate (1287.6 g), 71.3 g of cobalt nitrate, 36.5 g of zinc nitrate and 23.2 g of titanium tetrachloride were dissolved in 1300 ml of deionized water. Separately, 145.0 g of barium hydroxide and 1480 g of sodium hydroxide were dissolved in 1300 ml of deionized water. The two solutions were mixed to form a precipitate.

The slurry containing the formed precipitate was worked up in the same way as in Example 1 to give a barium ferrite powder.

X-ray powder diffractometry and composition analysis showed the resulting barium ferrite magnetic powder to be magnetoplumbite-type $BaO.(Fe_{10.4}Co_{0.8}Ti_{0.4}Zn_{0.4}O_{17.6})$.

The shape properties and the magnetic characteristics of the barium ferrite magnetic powder are shown in Table 2 below.

EXAMPLE 4

Ferric nitrate (1287.6 g), 53.5 g of cobalt nitrate, 17.8 g of nickel nitrate [$Ni(NO_3)_2.6H_2O$], 36.5 g of zinc nitrate and 23.2 g of titanium tetrachloride were dissolved in 1300 ml of deionized water. Separately, 145.0 g of barium hydroxide and 1480 g of sodium hydroxide were dissolved in 1300 ml of deionized water. The two solutions were mixed to form a precipitate.

The slurry containing the formed precipitate was put in an autoclave and hydrothermally treated at 145° C. for 8 hours. The precipitate was thoroughly washed with water, filtered, and dried. A 1:1 by weight mixture of NaCl and $BaCl_2.2H_2O$ as a flux was mixed with the precipitate (the weight of the flux was equal to that of the precipitate), and the mixture was calcined in an air atmosphere at 860° C. for 2 hours. The calcined product was thoroughly washed with water, filtered, and dried to obtain a barium ferrite magnetic powder.

X-ray powder diffractometry and composition analysis showed the resulting barium ferrite magnetic powder to be magnetoplumbite-type $BaO.(Fe_{10.4}Co_{0.6}Ni_{0.2}Ti_{0.4}Zn_{0.4}O_{17.6})$.

The shape properties and the magnetic characteristics of the resulting barium ferrite magnetic powder are shown in Table 2.

EXAMPLES 5-6

Example 4 was repeated except that the amount of barium hydroxide was changed to 116.0 g (Example 5) and 193.3 g (Example 6).

The shape properties and the magnetic characteristics of the resulting barium ferrite magnetic powders are shown in Table 2.

The relation between the saturation magnetizations and specific surface areas of the barium ferrite magnetic powders obtained in Examples 4 to 6 are shown in the Figure.

EXAMPLE 7

Ferric nitrate (1287.6 g), 35.7 g of cobalt nitrate, 35.6 g of nickel nitrate, 36.5 g of zinc nitrate and 23.2 g of titanium tetrachloride were dissolved in 1300 ml of deionized water. Separately, 145.0 g of barium hydroxide and 1480 g of sodium hydroxide were dissolved in 1300 ml of deionized water. The two solutions were mixed to form a precipitate.

The slurry containing the precipitate was worked up in the same way as in Example 4 to give a barium ferrite magnetic powder.

X-ray powder diffractometry and composition analysis showed the resulting barium ferrite magnetic powder to be magnetoplumbite-type $BaO.(Fe_{10.4}Co_{0.4}Ni_{0.4}Ti_{0.4}Zn_{0.4}O_{17.6})$.

The shape properties and the magnetic characteristics of the resulting barium ferrite magnetic powder are shown in Table 2.

EXAMPLES 8-10

Example 7 was repeated to give barium ferritre magnetic powders having the compositions shown in Table 2.

The shape properties and the magnetic characteristics of the products are also shown in Table 2.

COMPARATIVE EXAMPLE 4

Ferric nitrate (1287.6 g), 71.3 g of cobalt nitrate and 46.3 g of titanium tetrachloride were dissolved in 1300 ml of deionized water. Barium hydroxide (145.0 g) and 1480 g of sodium hydroxide were dissolved in 1300 ml of deionized water. The two solutions were mixed to form a precipitate.

The slurry containing the formed precipitate was worked up in the same way as in Example 4 to give a barium ferrite magnetic powder.

X-ray powder diffractometry and composition analysis showed the resulting barium ferrite magnetic powder to be magnetoplumbite-type $BaO\cdot(Fe_{10.4}Co_{0.8}Ti_{0.8}O_{18})$.

The shape properties and the magnetic characteristics of the resulting barium ferrite magnetic powder are shown in Table 2.

COMPARATIVE EXAMPLES 5-6

Comparative Example 4 was repeated except that the amount of barium hydroxide was changed 116.0 g (Comparative Example 5) and 193.3 g (Comparative Example 6).

The shape properties and the magnetic characteristics of the resulting barium ferrite magnetic powders are shown in Table 2.

The relation between the saturation magnetizations and specific surface areas of the barium ferrite powders obtained in Comparative Examples 4 to 6 are also shown in the FIGURE.

EXAMPLE 12

A magnetic recording medium was produced in the same way as in Example 11 except that the barium ferrite magnetic powder obtained in Example 5 was used. The reproduction output of the resulting magnetic recording medium was measured and is shown in Table 3.

COMPARATIVE EXAMPLE 7

A magnetic recording medium was produced in the same way as in Example 11 except that the barium ferrite magnetic powder obtained in Comparative Example 6 was used. The reproduction output of the resulting magnetic recording medium was measured and is shown in Table 3.

TABLE 3

| Recording frequency (MHz) | Reproduction output (%) (**) | | |
|---|---|---|---|
| | Example 11 | Example 12 | Comparative Example 7 |
| 1 | 120 | 125 | 100 |
| 2 | 102 | 108 | 88 |
| 3 | 78 | 82 | 56 |
| 5 | 66 | 71 | 33 |

(**): Relative values when the reproduction output at 1 MHz of the magnetic recording medium of Comparative Example 7 is taken as 100%.

TABLE 2

| | Composition | | | | | | Shape properties | | | Magnetic characteristics | | | |
|---|---|---|---|---|---|---|---|---|---|---|---|---|---|
| Run (*) | n | Fe | Co | Ni | Zn | Ti | O (α) | Particle diameter (nm) | Aspect ratio | Specific surface area (m²/g) | Coercive force (Oe) | Saturation magnetization (emu/g) | Anisotropic field distribution | Change of the coercive force with temperature (Oe/°C) |
| Ex. 3 | 1 | 10.4 | 0.8 | — | 0.4 | 0.4 | 0.4 | 65 | 6.4 | 51 | 420 | 59 | 3000 | 4.6 |
| Ex. 4 | 1 | 10.4 | 0.6 | 0.2 | 0.4 | 0.4 | 0.4 | 62 | 5.7 | 49 | 420 | 60 | 1400 | 2.2 |
| Ex. 5 | 1 | 10.4 | 0.6 | 0.2 | 0.4 | 0.4 | 0.4 | 70 | 5.5 | 42 | 480 | 61 | 1400 | 2.2 |
| Ex. 6 | 1 | 10.4 | 0.6 | 0.2 | 0.4 | 0.4 | 0.4 | 56 | 6.1 | 57 | 400 | 58 | 1500 | 2.4 |
| Ex. 7 | 1 | 10.4 | 0.4 | 0.4 | 0.4 | 0.4 | 0.4 | 60 | 5.6 | 50 | 620 | 61 | 1300 | 2.1 |
| Ex. 8 | 1 | 9.7 | 0.5 | 0.8 | 0.6 | 0.4 | 0.75 | 63 | 7.0 | 56 | 600 | 61 | 1300 | 0.3 |
| Ex. 9 | 1 | 9.8 | 0.3 | 0.7 | 0.8 | 0.4 | 0.7 | 70 | 7.9 | 55 | 810 | 62 | 1400 | 0.5 |
| Ex. 10 | 1 | 9.9 | 0.4 | 0.7 | 0.7 | 0.3 | 0.75 | 68 | 7.9 | 57 | 530 | 61 | 1300 | 0.8 |
| CEx. 4 | 1 | 10.4 | 0.8 | — | — | 0.8 | 0 | 70 | 3.2 | 30 | 450 | 56 | 1500 | 4.5 |
| CEx. 5 | 1 | 10.4 | 0.8 | — | — | 0.8 | 0 | 92 | 2.6 | 20 | 480 | 59 | 1600 | 4.6 |
| CEx. 6 | 1 | 10.4 | 0.8 | — | — | 0.8 | 0 | 62 | 4.3 | 40 | 420 | 53 | 1600 | 4.6 |

(*): Same as the footnote to Table 1

EXAMPLE 11

A magnetic paint was prepared by using the barium ferrite magnetic powder produced in Example 4 in accordance with the following formulation.

| Ingredient | Parts by weight |
|---|---|
| Magnetic powder | 100 |
| Vinyl chloride/vinyl acetate copolymer (VAGH, a product of Union Carbide Corporation) | 10 |
| Polyurethane resin (Nippolan, a product of Nippon Polyurethane Co., Ltd.) | 10 |
| Lecithin | 2 |
| Stearic acid | 2 |
| Methyl ethyl ketone | 70 |
| Methyl isobutyl ketone | 70 |
| Cyclohexanone | 70 |

The magnetic paint was coated on a polyethylene terephthalate film, subjected to field orientation at 3.5 kOe, dried, calendered, and heat-cured to produce a magnetic recording medium. The reproduction output of the magnetic recording medium was measured and is shown in Table 3.

What we claim is:

1. A hexagonal magnetoplumbite barium ferrite magnetic powder represented by the following formula $$BaO\cdot n(Fe_{12-x-y-z}M^1_xM^2_yZn_zO_{18-\alpha})$$

wherein $M^1$ represents at least one metal element selected from Co, Ni, Cu, Mg and Mn; $M^2$ represents at least one metal element selected from Zr, Ti and Ge; n is a number of from 0.8 to 1.0; x is a number of from 0.1 to 2.5; y is a number of from 0.1 to 1.5; z is a number of from 0.1 to 1.5; and α is ½ (3−m) (x+y+z) in which m is a number of 2.2 to 2.8 and represents an average atomic valence of $M^1$, $M^2$ and Zn, wherein said hexagonal magnetoplumbite barium ferrite magnetic powder has the characteristics
specific surface area: 20 to 70 m²/g
coercive force: 200 to 2,000 Oe
saturation magnetization: ≧55 emu/g
average particle diameter: 100 to 30 nm
aspect ratio: 2 to 15.

2. The magnetic powder of claim 1 wherein $M^1$ is Co or a combination of Co with at least one metal element selected from Ni, Cu, Mg and Mn.

3. The magnetic powder of claim 2 wherein $M^1$ represents $(Co_k M^3_{1-k})$ in which $M^3$ represents at least one metal element selected from Ni, Cu, Mg and Mn, and k is a number of more than 0 but less than 1.

4. The magnetic powder of claim 3 wherein $M^3$ is Ni and $M^2$ is Ti.

5. The magnetic powder of claim 1 wherein $M^2$ is Ti.

6. The magnetic powder of claim 1 wherein x is a number of 0.5 to 2.

7. The magnetic powder of claim 1 wherein y is a number of 0.1 to 1.0.

8. The magnetic powder of claim 1 wherein z is a number of 0.3 to 1.2.

9. The magnetic powder of claim 1 wherein x+y+z is a number of 1 to 4.

10. A magnetic recording medium comprising a support and a magnetic recording medium layer containing the hexagonal magnetoplumbite barium ferrite magnetic power set forth in claim 1.

* * * * *